June 28, 1960    F. E. COSTANZO    2,942,625
PIPE-END PROTECTORS
Filed Feb. 27, 1956

INVENTOR
Frank E. Costanzo

United States Patent Office 2,942,625
Patented June 28, 1960

2,942,625

PIPE-END PROTECTORS

Frank E. Costanzo, Pittsburgh 20, Pa.

Filed Feb. 27, 1956, Ser. No. 567,867

4 Claims. (Cl. 138—96)

This invention relates to pipe-end protectors and particularly to a novel pipe-end protector or cover which prevents the entry of foreign matter into the pipe while making it possible to handle the pipe with conventional pipe handling slings.

The ends of pipe, whether they be threaded or unthreaded, are easily damaged during handling by contact with one another or with other hard objects. Pipe is subject to many handling operations from the time it is first made until it is ultimately used, and it is frequently stored outdoors in this interim period. Pipe which is stacked tends to collect moisture in the interior and to corrode along its lowermost inner surface. At the same time, corrosion occurs on the outside surface where adjoining pipes contact one another. It is accordingly desirable that the ends of the pipe be protected and preferably closed during this period of time.

Various expedients have been proposed for the protection of pipe ends as well as for spacing the pipes one from another during storage. Most of the pipe-end protectors which have been proposed have been relatively complex and expensive to make and have involved the use of formed, relatively hard members of metal. These pipe-end protectors have either failed to close the ends of the pipe and simply covered the end threads or they have been difficult to maintain in position because of the expansion and contraction of gases within the pipe during temperature changes as well as by reason of the rough handling they receive. Moreover, it is common practice to use slings having fingers which enter the ends of pipe in order to lift or move the pipe. These fingers cannot be used with conventional pipe-end covers. I have invented a pipe-end protector and seal which overcomes the difficulties of prior devices. I provide a flexible conical member adapted to slide over the end to be covered having a base diameter greater than the diameter of the member to be covered. Means are provided for closing the base of the cone about the exterior of the pipe. The conical tip end of the cone extending beyond the end of the pipe is adapted to be inverted into the interior of the pipe whereby access into the end of the pipe is provided. In a preferred form, a drawstring is provided around the base of the cone whereby the base is closed over the outer periphery of the pipe end. Preferably the cone is made of a high tear strength paper capable of stretching in all directions and impregnated or coated with a waterproofing material. The paper may be reenforced with jute or similar material if desired.

This pipe-end protector will permit the entry of pipe sling fingers into the ends of the pipe while excluding moisture, dirt and foreign matter.

In the foregoing description I have described certain characteristics, objects and advantages of my invention. Other advantages, objects and characteristics of this invention will be apparent from a consideration of the following description and the accompanying drawings in which.

Figure 1:
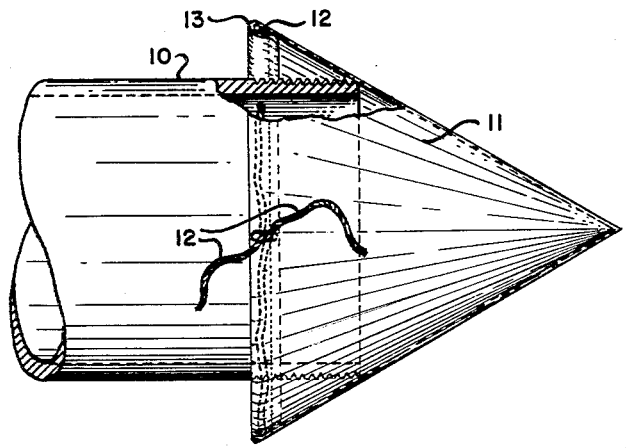
Figure 1 is a side elevation of a pipe-end protector according to my invention positioned for fastening to a pipe end.
Figure 2:
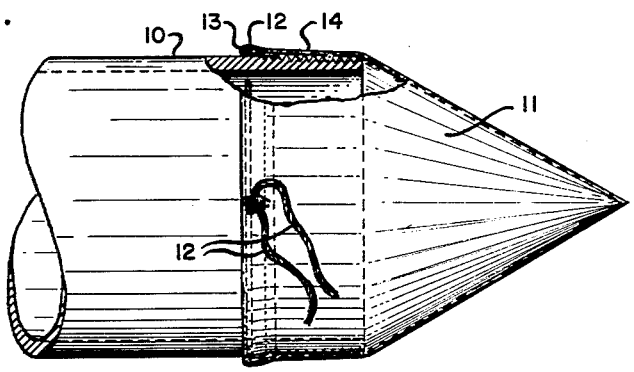
Figure 2 is a side elevation of the pipe-end protector of Figure 1 with the cone closed onto the pipe end.
Figure 3:
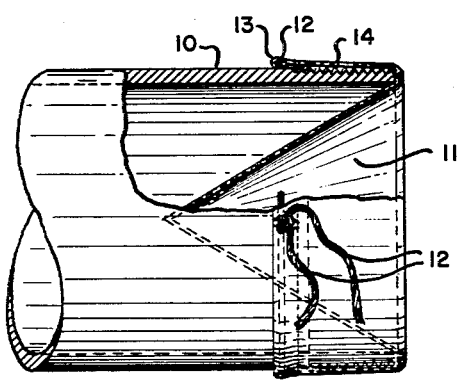
Figure 3 is a side elevation of the pipe-end protector of Figure 1 in final position.

Referring to the drawings, I have illustrated a pipe-end 10 to be protected. A cone 11 made of asphalt-impregnated paper is placed over the end of the pipe 10 (see Figure 1). The base of the cone 11 is provided with a drawstring 12 slidable within a loop 13 formed by turning up the base of the cone and sewing. The ends of the drawstring 12 are drawn through the loop 13 until the base of the cone is closed about the end of the pipe 10 whereupon the ends of the drawstring are tied to retain the base in position (see Figure 2). The end of the cone 11 is then inverted into the interior of the pipe 10 (see Figure 3) to seal the end of the pipe while at the same time making it possible to engage the pipe interior adjacent the end. The small flange 14 formed by the base of the cone 11 about the external periphery of the pipe acts as a spacer to space adjacent pipe apart out of contact with each other thereby preventing the external corrosion which characterizes pipe stacked in contact with one another.

The form and resilient nature of the cap end, and particularly the inverted conical tip of the pipe-end, prevents the pipe protector from being ejected from the pipe by the expansion of gases within the pipe as, for example, when the pipe is piled or stored in the sun. In addition the nature of the cap prevents the entry of rain or other moisture into the pipe and thereby prevents internal corrosion. The inverted conical tip end immediately discharges any rain which blows into the end of the pipe.

While I have illustrated and described the present and preferred embodiment of my invention, it will be understood that this invention may be otherwise embodied within the scope of the following claims.

I claim:

1. In combination a pipe-end to be protected, a flexible conical member fitting over the pipe-end to be protected, said pipe-end having an opening therein and closure means bringing the base of the conical member into contact with the external periphery of the end to be protected whereby to surround said end, said conical member having its conical tip portion inverted into the open end of the pipe whereby the end of the pipe is surrounded while access into the opening in the end for a limited distance is provided.

2. In combination a pipe-end to be protected, a conical member of moisture retarding paper fitting over the pipe-end to be protected, said pipe-end having an opening therein and closure means bringing the base of the conical member into contact with the external periphery of the end to be protected whereby to surround said end, said conical member having its conical tip portion inverted into the open end of the pipe whereby the end of the pipe is surrounded while access into the opening in the end for a limited distance is provided.

3. In combination a pipe-end to be protected, a flexible conical member having a base diameter greater than the diameter of a pipe to be covered, said pipe-end having an opening therein, a passageway surrounding the base of the conical member and a drawstring in said passageway whereby the base of the cone may be drawn into closing contact with the external periphery of the pipe whereby to surround said end, said flexible conical member having its conical tip portion inverted into the open end of the pipe whereby the end of the pipe is surrounded while access into the opening in the end for a limited distance is provided.

4. In combination a pipe-end to be protected, a flexible conical member of paper capable of being stretched in all directions and treated to resist the penetration of moisture, said conical member having a base diameter greater than the diameter of the pipe-end to be covered, said pipe-end having an opening therein, a passageway surrounding the base of the conical member and a drawstring in said passageway whereby the base of the cone may be drawn into closing contact with the external periphery of the pipe whereby to surround said end, said flexible conical member having its conical tip portion inverted into the open end of the pipe whereby the end of the pipe is surrounded while access into the opening in the end for a limited distance is provided.

References Cited in the file of this patent

UNITED STATES PATENTS

| Number | Name | Date |
|---|---|---|
| 777,609 | Deane | Dec. 13, 1904 |
| 808,567 | McManus | Dec. 26, 1905 |
| 835,673 | Fross | Nov. 13, 1906 |
| 1,687,004 | Briggs | Oct. 9, 1928 |
| 1,867,677 | Nielsen | July 19, 1932 |
| 1,997,291 | Barroll | Apr. 9, 1935 |
| 2,075,243 | Urschel | Mar. 30, 1937 |
| 2,078,835 | Brisson | Apr. 27, 1937 |
| 2,179,864 | Scott | Nov. 14, 1939 |
| 2,230,987 | Karl | Feb. 4, 1941 |

FOREIGN PATENTS

| Number | Country | Date |
|---|---|---|
| 270,197 | Great Britain | May 5, 1927 |
| 300,411 | Italy | Sept. 8, 1932 |